US010514957B2

(12) United States Patent
Combellas et al.

(10) Patent No.: US 10,514,957 B2
(45) Date of Patent: *Dec. 24, 2019

(54) NETWORK SERVICE INFRASTRUCTURE MANAGEMENT SYSTEM AND METHOD OF OPERATION

(71) Applicant: Level 3 Communications, LLC, Broomfield, CO (US)

(72) Inventors: Claudia M. Combellas, Centennial, CO (US); Dana Johnston, Littleton, CO (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/134,459

(22) Filed: Sep. 18, 2018

(65) Prior Publication Data
US 2019/0018706 A1 Jan. 17, 2019

Related U.S. Application Data

(63) Continuation of application No. 15/094,273, filed on Apr. 8, 2016, now Pat. No. 10,078,535.

(Continued)

(51) Int. Cl.
*G06F 9/455* (2018.01)
*G06F 9/50* (2006.01)
*H04L 29/08* (2006.01)

(52) U.S. Cl.
CPC .......... *G06F 9/505* (2013.01); *G06F 9/45558* (2013.01); *H04L 67/1008* (2013.01);
(Continued)

(58) Field of Classification Search
CPC ......... G06F 2009/45595; G06F 9/5077; G06F 2009/45562; G06F 9/5005; G06F 2201/815
See application file for complete search history.

(56) References Cited

U.S. PATENT DOCUMENTS 7,275,249 B1 9/2007 Miller et al.
9,288,148 B1* 3/2016 Krishnaswamy ... H04L 41/0893
(Continued)

FOREIGN PATENT DOCUMENTS

WO WO-2014208661 12/2014

OTHER PUBLICATIONS

Extended European Search Report, dated Oct. 16, 2018, Application No. 16777364.7, filed Apr. 8, 2016; 6 pgs.
(Continued)

*Primary Examiner* — Dong U Kim

(57) ABSTRACT

A network service infrastructure management system includes a computing system that communicates with a network service computing device to receive a request to generate a network service comprising one or more network node functions. Based on the request the computing system communicates with an operating system of the network service computing device to instantiate one or more tasks corresponding to the one or more network node functions in which each task is instantiated at a level of workload capability specified for its respective network node function. Once instantiated, the computing system may then launch each network node function on its respective task.

19 Claims, 4 Drawing Sheets

Related U.S. Application Data

(60) Provisional application No. 62/145,110, filed on Apr. 9, 2015.

(52) U.S. Cl.
CPC ............... *G06F 2009/4557* (2013.01); *G06F 2009/45595* (2013.01)

(56) References Cited

U.S. PATENT DOCUMENTS

| | | | |
|---|---|---|---|
| 2012/0216194 A1 | 8/2012 | Hadas | |
| 2014/0201374 A1* | 7/2014 | Ashwood-Smith | H04L 49/70 709/226 |
| 2014/0317261 A1 | 10/2014 | Shatzkamer et al. | |
| 2014/0376555 A1 | 12/2014 | Choi | |
| 2015/0063166 A1* | 3/2015 | Sif | G06F 9/45558 370/254 |
| 2015/0082378 A1 | 3/2015 | Collison | |
| 2015/0178117 A1* | 6/2015 | Ryu | G06F 9/45558 718/1 |
| 2015/0200838 A1* | 7/2015 | Nadeau | H04L 45/124 398/58 |
| 2015/0326535 A1* | 11/2015 | Rao | H04L 41/5054 726/15 |
| 2016/0057102 A1* | 2/2016 | Wei | H04L 61/2007 709/226 |
| 2016/0147548 A1 | 5/2016 | Itsumi et al. | |
| 2016/0299783 A1 | 10/2016 | Combellas et al. | |
| 2017/0012898 A1* | 1/2017 | Zhu | H04L 12/6418 |

OTHER PUBLICATIONS

International Preliminary Report on Patentability dated Oct. 10, 2017, Int'l Appl. No. PCT/US16/026660, Int'l Filing Date Apr. 8, 2016; 8 pgs.

International Search Report dated Jul. 11, 2016, Int'l Appl. No. PCT/US16/026660, Int'l Filing Date Apr. 8, 2016; 3 pgs.

Written Opinion of the International Searching Authority dated Jul. 11, 2016, Int'l Appl. No. PCT/US16/026660, Int'l Filing Date Apr. 8, 2016; 6 pgs.

\* cited by examiner

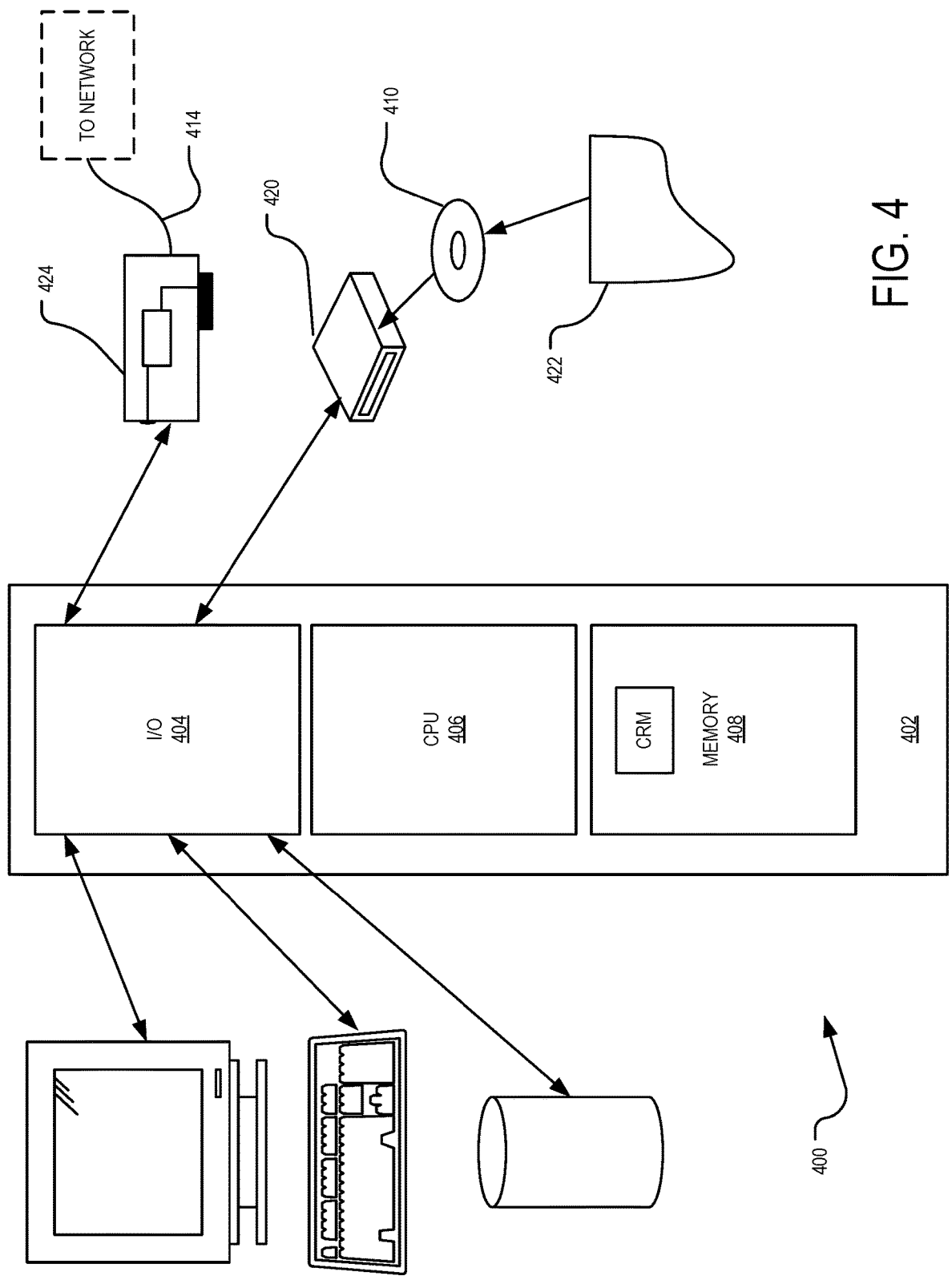

NETWORK SERVICE INFRASTRUCTURE MANAGEMENT SYSTEM AND METHOD OF OPERATION

TECHNICAL FIELD

Aspects of the present disclosure generally relate to communication networks, and more particularly, to a network service infrastructure management system and method of operation.

BACKGROUND

Network Functions Virtualization (NFV) refers to a technology in which a virtualization technology is used to design a network structure with industry standard servers, switches, and storage that are provided as devices at a user end. That is, the NFV technology implements network functions as software that can be run in existing industry standard servers and hardware. NFV technology may also be supported by a cloud computing technology and in some cases, may also utilize various industry-standard high volume server technologies.

Using NFV, networks may be implemented that scale easily due the extensibility provided by virtualization. Nevertheless, conventional NFV architectures may not scale down easily for relatively small, lightweight services that are numerous, but do not require large amounts of workload capabilities from the resources they are executed on. It is with these observations in mind, among others, that various aspects of the present disclosure were conceived and developed.

SUMMARY

A network service infrastructure management system includes a computing system that communicates with a network service computing device to receive a request to generate a network service comprising one or more network node functions. Based on the request the computing system communicates with an operating system of the network service computing device to instantiate one or more tasks corresponding to the one or more network node functions in which each task is instantiated at a level of workload capability specified for its respective network node function. Once instantiated, the computing system may then launch each network node function on its respective task.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

FIG. 4 illustrates an example of a computing system that may implement various systems and methods discussed herein.

DETAILED DESCRIPTION

Aspects of the present disclosure involve systems and methods for implementing an infrastructure for a network function virtualization (NFV) environment in which individual network node functions (NNFs) of the NFV may be instantiated as separate tasks in a computing environment. Whereas conventional NNFs have been typically implemented as independently operating virtual machines that required their own distinct operating environment, this type of structure has not been readily conducive for large quantities of lightweight (e.g., reduced throughput) network services that each typically uses a small fraction of the virtual machine's capabilities, thus wasting a computing system's resources on what could otherwise be provided for other network services on the computing system. Embodiments of the present disclosure provide a solution to this problem by instantiating NNFs on separate tasks of a computing environment in a manner that provides control over a workload capability for each task so that relatively large quantities of NNFs may be simultaneously provided on the computing system in an efficient, organized manner.

Figure 1:
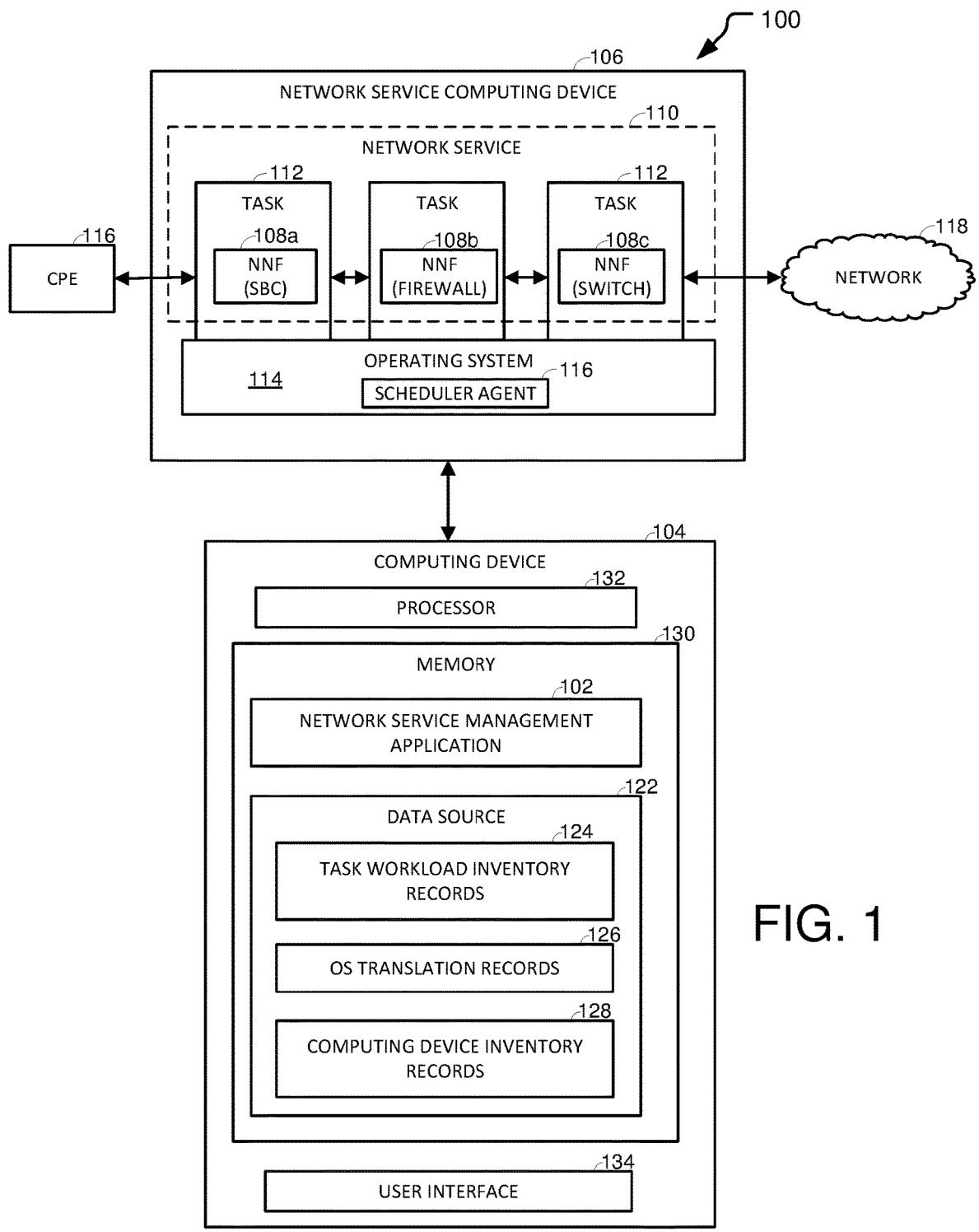
FIG. 1 illustrates an example network service infrastructure management system according to one embodiment of the present disclosure.

FIG. 1 illustrates an example network service infrastructure management system 100 according to the teachings of the present disclosure. The network service infrastructure management system 100 includes a network service infrastructure management application 102 that is executed on a network service infrastructure management computing device 104 to control a network service computing device 106 to execute each of one or more network node functions (NNFs) 108 of a network service 110 on a task 112 in which each task 112 is separately controllable by an operating system 114 of the network service computing device 106. Although only one network service computing device 106 is shown and described herein, it should be understood that the network service infrastructure management system 100 may control multiple network service computing devices 106 to provide an infrastructure for multiple network services 110 on multiple computing devices 106.

The network service 110 generally refers to one or more applications (e.g., NNFs) running at a network application layer that collectively provide communication services for a user. As shown, the network service 110 provides network connectivity of a customer premises equipment (CPE) 116, such as a private branch exchange (PBX), to a communication network 118, such as the Internet. Nevertheless, other embodiments contemplate that the network service 110 may include any type of communication service provided by network node functions configured according to a network functions virtualization (NFV) network architecture.

The network service 110 includes one or more network node functions (NNFs) 108. The NNFs 108 as shown include a session border controller (SBC) 108a, a firewall 108b, and a switch (e.g., router) 108c. Examples of other NNFs that may be provided by the network service infrastructure management system 100 include load balancers, intrusion detection devices, and wide area network (WAN) accelerators to name a few.

In general, the application 102 independently controls the workload capability of each task according to a specified level. That is, the application 102 may instantiate a first NNF 108 on a first task 112 with a first workload capacity level, and instantiate a second NNF 108 on a second task 112 with a second workload capacity level that is different from the workload capacity level of the first task 112. The workload capability of each task 112 generally refers to a level of workload that may be performed by that task 112. Examples of workload capabilities of each task 112 that may be managed by the network service infrastructure management application 102 include a processing capability (e.g., the number of processors, a processing speed of each processor, etc.) of the task, a throughput capability (e.g., the rate at which data may be conveyed through the task), and/or a memory capacity level (e.g., the amount of memory delegated to the task 112).

The network service infrastructure management application 102 communicates with the operating system 114 to instantiate tasks 112, launch an NNF 108 on each task 112, and manage or otherwise modify a level of workload capability of each task 112 according to the needs of each NNF 108. For example, the network service infrastructure management application 102 may determine that the firewall 108b needs to have 5.0 percent of the available processing capability of the computing device 106, and have a throughput of approximately 500 Kilobits-per-second. In such a case, the network service infrastructure management application 102 communicates with the operating system 114 to instantiate a task 112 having sufficient resources to meet this requested workload capability.

In one embodiment, a scheduler agent 116 may be provided that is executed on the operating system 114 to communicate between the operating system 114 and the application 102 for controlling the operation of the tasks 112. For example, the scheduler agent 116 may communicate with a monitoring program running on the operating system, such as a 'task manager' program to obtain measured values of workload capability for each task 112 as well as overall used workload capability for the operating system and transmit this information to the application 102. As another example, the scheduler agent 116 may translate instructions received from the application 102 into a form suitable for communication with the operating system 114, thus enabling the application 102 to control the operation of tasks 112 on differing operating systems. The scheduler agent 116 may share some, none, or all processing responsibilities with the application 102 for providing the features of the present disclosure described herein. Additionally, the scheduler agent 116 may be omitted if not needed or desired.

The tasks 112 may be embodied in any suitable form. In one particular embodiment, the tasks 112 comprise threads such as those provided by an operating system (e.g., a UNIX operating system, a Linux operating system, etc.). In such a case, the workload capability of the tasks may be modified using a 'nice', 'renice', and/or 'ionice' executable program issued to each task 112. The 'nice' program may be issued to newly instantiated NNFs 108, while the 'renice' program may be issued to currently running programs to control a level of priority for each task 112. The 'ionice' program may be issued to adjust a throughput capacity of each task 112. The 'nice/renice', and 'ionice' programs are used to invoke a utility or shell script with a particular priority, thus giving the resulting task 112 more or less processing time and throughput capacity, respectively. In most operating systems that support the 'nice' program, the 'nice' program may be invoked with an integer argument that ranges from '−20' (e.g., highest priority) to '19' (e.g., the lowest priority). Thus, when a NNF 108 is instantiated within a new task 112, the application 102 may issue the 'nice' program with an integer argument specifying a workload capability to be associated with that NNF 108.

In one embodiment, the application 102 may calculate the integer argument according to a combined workload capability of other tasks 112 currently running on the operating system 114 and the workload capability of the operating system 114 itself. The workload capability of other tasks 112 may include specified levels of workload capability for each existing task 112 stored in one or more task workload inventory records 124 and measured values of workload capability used by each task 112. The used workload capability may be obtained in any suitable manner. In one embodiment, the application 102 may communicate with a monitoring program running on the operating system, such as a 'task manager' program to obtained measured values of workload capability for each task 112 as well as overall used workload capability for the operating system.

For example, when a new NNF 108 is to be instantiated with a workload capability capacity of 0.5 million instructions per second (MIPS), the application 102 may obtain the total available workload capability of the operating system 114 from the computing system inventory records 128, obtain the specified workload capacities of the existing NNFs 108 from the task workload inventory records 124, obtain the total amount of workload capability being used by the currently running NNFs 108, and calculate an integer argument based upon the obtained values. In one case, if the combined workload capability of the existing tasks 112 consume approximately 50 percent of overall workload capability usage, the application 102 may instantiate the new task 112 with a integer argument of '0' to ensure that the new task 112 can function at 0.5 MIPS. However, if the combined workload capability of the existing tasks 112 consume approximately 80 percent of overall workload capability usage, the application 102 may instantiate the new task 112 with a lower integer argument (e.g., '−1' to '−19') to ensure that the new task 112 can still function at 0.5 MIPS. Additionally, the application 102 may adjust the integer arguments to the other existing tasks 112 to ensure their specified workload capability usage is properly met.

The network service management system 100 also includes a data source 122 that stores task workload inventory records 124, operating system translation records 126, and computing system inventory records 128. The task workload inventory records 124 store information about existing tasks 112 being executed on the network service computing device 106. For example, when a new task 112 is instantiated, its specified workload capability may be stored in the task workload inventory records 124 so that when an ensuing task 112 is instantiated, the application 102 may access this information to ensure that the specified workload capability for all tasks 112 executed on the operating system 114 are maintained. The operating system translation records 126 store information about instructions or other forms of communication that may be particular to each type of operating system 114. The computing system inventory records 128 store information about the operating system 114 in use, such as its rated performance characteristics (e.g., quantity and speed of processors, amount of memory, I/O throughput level, etc.) that may be used by the application 102 to ensure that the specified workload capability may be attained for newly instantiated tasks 112.

The network service management computing device 104 includes at least one processor 132 to execute the network service management application 102. The processor 132 includes one or more processors or other processing devices.

A processor is hardware. Examples of such a computing device may include one or more servers, personal computers, mobile computers and/or other mobile devices, and other computing devices. The computing device 104 may communicate with the network service computing device 106 in any suitable manner, such as via wireless, wired, and/or optical communications.

The network service computing device 104 also includes a memory (e.g., computer readable media) 130 on which the application 102 and data source 122 are stored. The computer readable media 130 may include volatile media, nonvolatile media, removable media, non-removable media, and/or another available media that can be accessed by the computing device 104. By way of example and not limitation, computer readable media 130 comprises computer storage media and communication media. Computer storage media includes non-transient storage memory/media, volatile media, nonvolatile media, removable media, and/or non-removable media implemented in a method or technology for storage of information, such as computer/machine readable/executable instructions, data structures, program modules, and/or other data. Communication media may embody computer readable instructions, data structures, program modules, or other data and include an information delivery media or system.

According to one aspect, the computing device 104 may also include a user interface (UI) 134 that may be displayed on a display, such as a computer monitor, for displaying data. Entry of user information may be provided by an input device, such as a keyboard or a pointing device (e.g., a mouse, trackball, pen, or touch screen) to enter data into or interact with the user interface 134.

Figure 2:
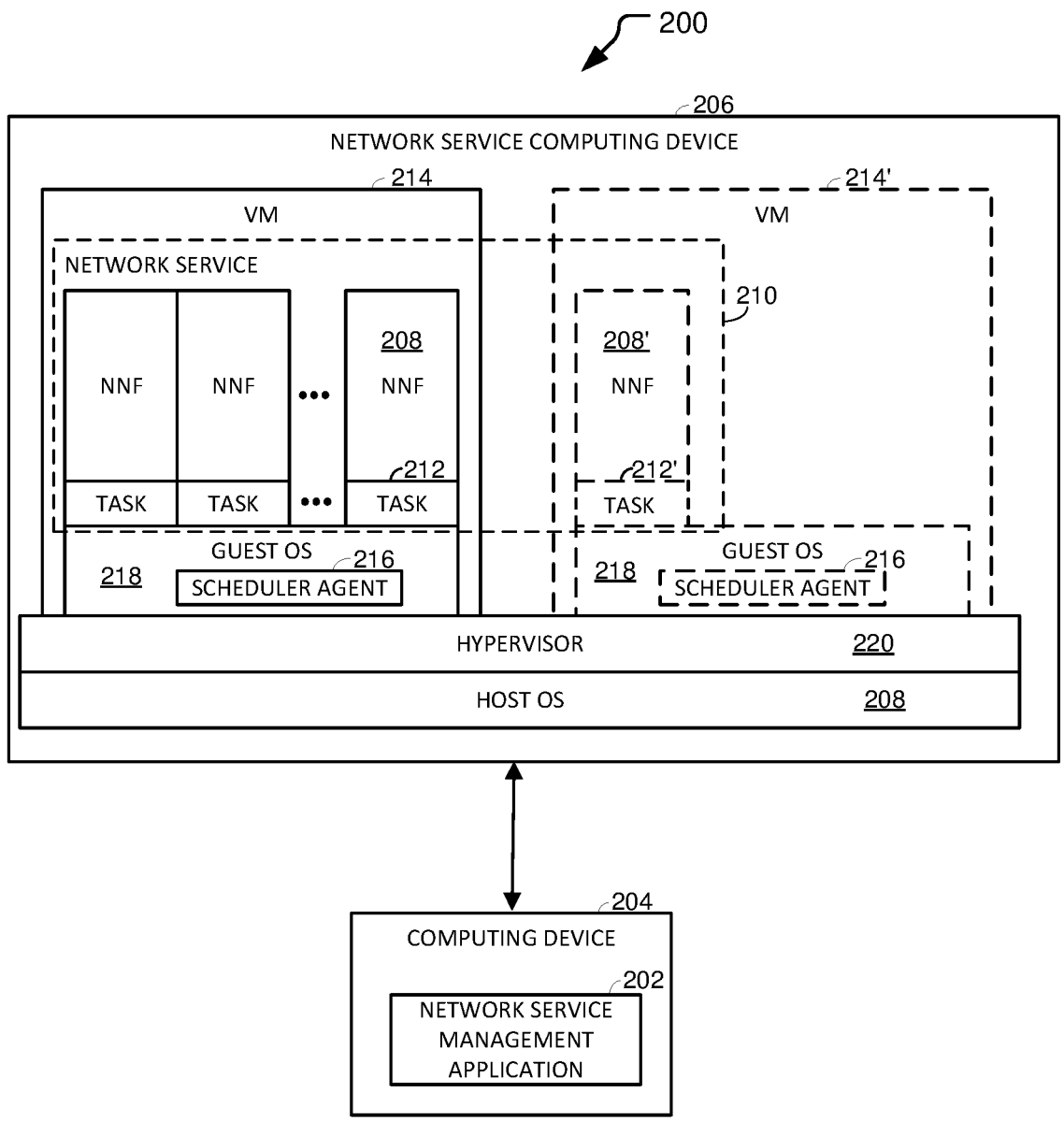
FIG. 2 illustrates another example network service infrastructure management system that may be used to manage the operation of network node functions (NNFs) in a virtualized computing environment according to the teachings of the present disclosure.

FIG. 2 illustrates another example network service infrastructure management system 200 that may be used to manage the operation of NNFs 208 in a virtualized computing environment according to the teachings of the present disclosure. The network service infrastructure management system 200 includes a network service infrastructure management application 202, and scheduler agent 216, and a network service infrastructure management computing device 204 that are similar in design and construction to the network service infrastructure management application 102, scheduler agent 116, and network service infrastructure management computing device 104 of FIG. 1. The network service infrastructure management system 200 is different, however, in that a network service 210 is provided by a network service computing device 206 that functions in a virtualized computing environment.

The network service computing device 206 includes a host operating system 208 that executes a hypervisor 220 that manages one or more virtual machines (VMs) 214. Each VM 214 includes a guest operating system 218 that independently manages multiple scheduled tasks 212 using a scheduler agent 216. According to embodiments of the present disclosure, each network node function (NNF) 208 of the network service 210 is executed by a task 212 such that multiple NNFs 208 may be executed on one or a few VMs 214 in which a workload capability of each task 212 may be independently managed by the scheduler agent 216.

When the network service 210 is used in a virtualized computing environment, the application 102 may manage the instantiation of new VMs 214 and/or deletion of existing VMs 214 to ensure that the specified workload capability of the NNFs 108 are maintained. For example, the application 102 may instantiate a new VM 214' and instantiate a new task 112' on the new VM 214' when the first VM 214 cannot meet the specified workload capability of the new NNF 108.

Furthering the example from above, if the combined workload capability of the existing tasks 112 consumes approximately 90 percent of overall workload capability usage, the application 102 recognizes that the existing VM 214 cannot provide the specified workload capability for the new task 112, and thus may instantiate a new VM 214' so that the specified workload capability of the new task may be maintained at its specified level.

The application 202 may communicate with the hypervisor 220 to adjust an amount of workload capability provided to the VM 214 such that the workload capabilities provided to all tasks 212 executed on the VM 214 is maintained. For example, when a new task 112 is to be launched on the VM 214 that already has 20 tasks 112 currently operating at approximately 5 percent processing capability, the network service infrastructure management application 102 may communicate with the hypervisor 116 to increase a quantity of processors delegated to the VM 214 such that the addition of the new task 112 does not cause the existing tasks 112 to fall below their specified workload capability.

In one embodiment, a NNF 108 may include executable code that is able to manipulate or change the workload capability of its associated task 112. For example, the firewall NNF 108b, which may not need a large amount of workload capability during off peak hours, may execute code to communicate with the guest operating system 114 to reduce its allocated processing capability by issuing a 'nice' command with a high value (e.g., 20) upon the task 112, and when a barrage of incoming packets occurs during a peak usage time of day, issue another 'nice' command with a lower value (e.g., −20) to obtain greater processing capability.

Although FIGS. 1 and 2 illustrates example network service infrastructure management applications 102/202 that may be used to orchestrate NNFs 108/208 that function in a NFV architecture, other example network service infrastructure management application 102/202 may include additional features, fewer features, or different features than what is described herein above. For example, the network service infrastructure management application 102/202 may control the hypervisor 116 to instantiate additional VMs 214 for executing more NNFs 208 using more tasks 112/212, and/or remove existing VMs 214 when they are not needed. Additionally, the network service infrastructure management application 102/202 may specify a certain level of workload capability when the NNFs 208 are launched and may modify the level of workload capability of the NNFs 208 as they are executed. As yet another example, the network service infrastructure management application 102 may control an operating system that is not a VM (e.g., the host operating system 114) to instantiate tasks 112/212 for executing the NNFs 208 of the network service 110/210.

Figure 3:
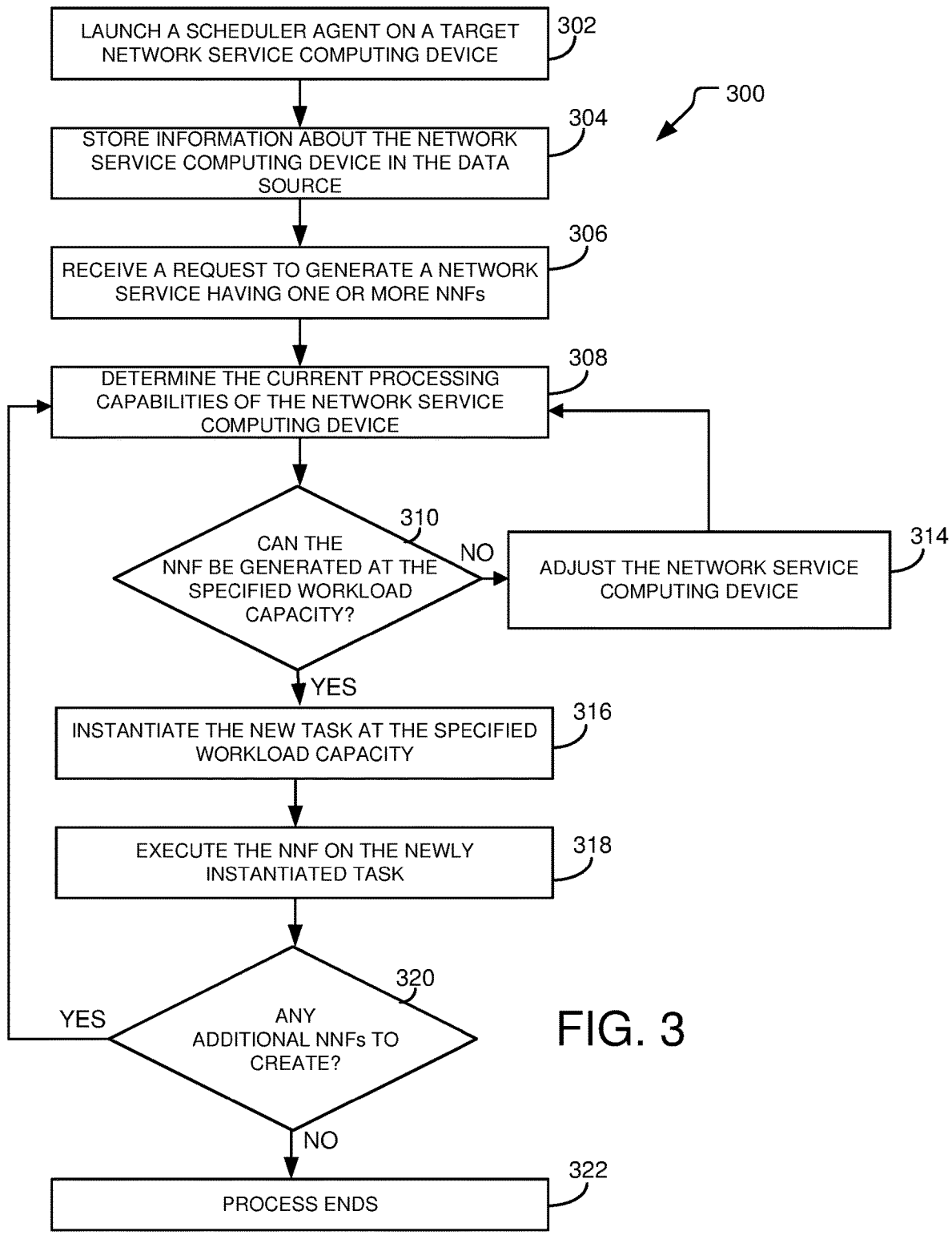
FIG. 3 illustrates an example process that may be performed by the network service management application according to one embodiment of the present disclosure.

FIG. 3 illustrates an example process 300 that may be performed by the network service management application according to one embodiment of the present disclosure.

In step 302, the application launches a scheduler agent on the target network service computing device. In one embodiment, the application may identify a type of the operating system and launch one of multiple available scheduler agents based upon the operating system's type. Whereas differing types of operating systems (e.g., UNIX, Linux, Windows, OS/2, Mac OS, RISC OS, etc.) may have unique characteristics and modes of communication, the application may select a scheduler agent that is suitable for communicating with the unique characteristics of the identified type of operating system. Thereafter in step 304, the application stores information (e.g., operating system type, performance characteristics, etc.) as one or more computing system inventory records 128 in the data source 122.

In step 306, the application receives a request to generate a network service having one or more NNFs. In one embodiment, the request may include a specified workload capability to be assigned to each NNF. That is, the specified workload capability may be included in the request received by the application. In other embodiments, the specified workload capability may be received in other forms, such as via manual entry by a user, or a preset value that is received prior to the request being received. In some cases, the application may determine the specified workload capability according to the type of NNF being generated. For example, one preset workload capability value may be stored for firewall NNFs, while another preset workload capability value may be stored for switch NNFs. Thus, when a new NNF is to be generated, the application 102 may identify the type of the NNF and select a preset workload capability value based upon that type of NNF. The preset workload capability values may be stored as task workload inventory records 124 in the data source.

In step 308, the application 102 determines the current processing capabilities of the network service computing system. For example, the application may communicate with a monitoring application (e.g., task manager) executed on the network service computing system to identify its current usage level and/or access the computing device inventory records to identify is rated performance level. Thereafter in step 310, the application determines whether the NNF can be generated on the network service computing device at its specified workload capacity. If so, processing continues at step 312; otherwise processing continues at step 314.

At step 314, the application adjusts the network service computing device to increase its workload capability level so that the new NNF may be generated. For example, if the network service computing device is implemented in a virtualized computing environment, the application may, via communication with its hypervisor, add one or more processors and/or add additional memory allocated to the VM that is to execute the NNF. As another example, the application 102 may instantiate another VM within the virtualized computing environment that may be used to execute the new NNF. Once the network service computing device has been adjusted, processing continues at step 308 to determine whether the adjusted network service computing device has sufficient workload capability to execute the new NNF at its specified workload capacity.

At step 316, the application instantiates the new task at the specified workload capacity. The application then launches new NNF on the task to commence its operation at step 318. At step 320, the application determines whether any additional NNF are to be generated on the network service computing system. If so, processing continues at step 308 to determine whether the network service computing device has sufficient workload capacity; otherwise, processing continues at step 322 in which the process ends.

The process described above may be embodied in other specific forms without departing from the spirit or scope of the present disclosure. For example, the process may include fewer, different, or additional steps than what is described herein. Additionally, the steps may be conducted in a differing order than that described herein.

FIG. 4 illustrates an example computing system 400 that may implement various systems, such as the application 102, and methods discussed herein, such as process 400. A general purpose computer system 400 is capable of executing a computer program product to execute a computer process. Data and program files may be input to the computer system 400, which reads the files and executes the programs therein such as the application 504. Some of the elements of a general purpose computer system 400 are shown in FIG. 4 wherein a processing system 402 is shown having an input/output (I/O) section 404, a hardware central processing unit (CPU) 406, and a memory section 408. The processing system 402 of the computer system 400 may have a single hardware central-processing unit 406 or a plurality of hardware processing units. The computer system 400 may be a conventional computer, a server, a distributed computer, or any other type of computing device, such as one or more external computers made available via a cloud computing architecture. The presently described technology is optionally implemented in software devices loaded in memory 408, stored on a configured DVD/CD-ROM 410 or storage unit 412, and/or communicated via a wired or wireless network link 414, thereby transforming the computer system 400 in FIG. 4 to a special purpose machine for implementing the described operations.

The memory section 408 may be volatile media, nonvolatile media, removable media, non-removable media, and/or other hardware media or hardware mediums that can be accessed by a general purpose or special purpose computing device. For example, the memory section 408 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 404 is connected to one or more optional user-interface devices (e.g., a user interface such as a keyboard 416 or the user interface 512), an optional disc storage unit 412, an optional display 418, and an optional disc drive unit 420. Generally, the disc drive unit 420 is a DVD/CD-ROM drive unit capable of reading the DVD/CD-ROM medium 410, which typically contains programs and data 422. Computer program products containing mechanisms to effectuate the systems and methods in accordance with the presently described technology may reside in the memory section 408, on a disc storage unit 412, on the DVD/CD-ROM medium 410 of the computer system 400, or on external storage devices made available via a cloud computing architecture with such computer program products, including one or more database management products, web server products, application server products, and/or other additional software components. Alternatively, a disc drive unit 420 may be replaced or supplemented by a floppy drive unit, a tape drive unit, or other storage medium drive unit. An optional network adapter 424 is capable of connecting the computer system 400 to a network via the network link 414, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 400 is connected (by wired connection and/or wirelessly) to a local network through the network interface or adapter 424, which is one type of communications device. When used in a WAN-networking environment, the computer system 400 typically includes a modem, a network adapter, or any other type of communications device for establishing communications over the wide area network. In a networked environment, program modules depicted relative to the computer system 400 or portions thereof, may be stored in a remote memory storage device. It is appreciated that the network connections shown are examples of communications devices for and other means of establishing a communications link between the computers may be used.

In an example implementation, source code executed by the control circuit 118, a plurality of internal and external databases optionally are stored in memory of the control circuit 118 or other storage systems, such as the disk storage unit 412 or the DVD/CD-ROM medium 410, and/or other external storage devices made available and accessible via a network architecture. The source code executed by the control circuit 118 may be embodied by instructions stored on such storage systems and executed by the processing system 402.

Some or all of the operations described herein may be performed by the processing system 402, which is hardware. Further, local computing systems, remote data sources and/or services, and other associated logic represent firmware, hardware, and/or software configured to control operations the system 100 and/or other components. The system set forth in FIG. 4 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A network service infrastructure management system comprising:
   a computing system in communication with a network service computing device and comprising at least one memory for storing instructions that are executed by at least one processor to:
   receive a request to generate a network service comprising a plurality of network node functions;
   communicate with an operating system of the network service computing device to instantiate a plurality of tasks corresponding to the plurality of network node functions, each task being instantiated at a level of workload capability specified for its respective network node function; and
   launch each network node function on its respective task.

2. The system as recited in claim 1, wherein the operating system comprises a virtual machine (VM), the instructions further executed to communicate with a hypervisor that manages the VM to adjust workload capabilities of the VM so that the specified level of workload capability of each task is maintained.

3. The system as recited in claim 1, wherein the instructions are executed to perform at least one of instantiating a new VM or deleting an existing VM to maintain the specified level of workload capacity.

4. The system as recited in claim 1, wherein the instructions are executed to:
   receive a level of processing capability to be provided for at least one of the network node functions; and
   adjust the workload capability of the tasks on which the network node functions is executed.

5. The system as recited in claim 1, wherein the tasks comprise threads of the operating system.

6. The system as recited in claim 1, wherein the instructions are executed to calculate a composite workload capacity according to a workload capacity of the operating system and a combined workload capacity of other tasks executed on the operating system.

7. The system as recited in claim 1, wherein the instructions are executed to communicate with the operating system using a scheduler agent executed on the operating system, the scheduler agent translating instructions from the instructions to a format suitable for use by the operating system.

8. A network service infrastructure management method comprising:
receiving, using instructions stored on at least one computer-readable medium and executed by at least one processor, a request to generate a network service comprising a plurality of network node functions;
communicating, using the instructions, with an operating system of the network service computing device to instantiate a plurality of tasks corresponding to the plurality of network node functions, each task being instantiated at a level of workload capability specified for its respective network node function; and
launching, using the instructions, each network node function on its respective task.

9. The method as recited in claim 8, further comprising communicating with a hypervisor that manages a virtual machine (VM) to adjust workload capabilities of the VM so that the specified level of workload capability of each task is maintained.

10. The method as recited in claim 9, further comprising performing at least one of instantiating a new VM or deleting an existing VM to maintain the specified level of workload capacity.

11. The method as recited in claim 8, further comprising:
receiving a level of processing capability to be provided for at least one of the network node functions; and
adjusting the workload capability of the tasks on which the network node functions is executed.

12. The method as recited in claim 8, further comprising calculating a composite workload capacity according to a workload capacity of the operating system and a combined workload capacity of other tasks executed on the operating system.

13. The method as recited in claim 8, further comprising communicating with the operating system using a scheduler agent executed on the operating system, the scheduler agent translating instructions from the instructions to a format suitable for use by the operating system.

14. A non-transitory computer-readable medium encoded with a route monitoring service comprising instructions executable by a processor to:
receive a request to generate a network service comprising a plurality of network node functions;
communicate with an operating system of the network service computing device to instantiate a plurality of tasks corresponding to the plurality of network node functions, each task being instantiated at a level of workload capability specified for its respective network node function; and
launch each network node function on its respective task.

15. The non-transitory computer-readable medium as recited in claim 14, wherein the operating system comprises a virtual machine (VM), the instructions further executed to communicate with a hypervisor that manages the VM to adjust workload capabilities of the VM so that the specified level of workload capability of each task is maintained.

16. The non-transitory computer-readable medium as recited in claim 14, further executed to perform at least one of instantiating a new VM or deleting an existing VM to maintain the specified level of workload capacity.

17. The non-transitory computer-readable medium as recited in claim 14, further executed to:
receive a level of processing capability to be provided for at least one of the network node functions; and
adjust the workload capability of the tasks on which the network node functions is executed.

18. The non-transitory computer-readable medium as recited in claim 14, further executed to calculate a composite workload capacity according to a workload capacity of the operating system and a combined workload capacity of other tasks executed on the operating system.

19. The non-transitory computer-readable medium as recited in claim 14, further executed to communicate with the operating system using a scheduler agent executed on the operating system, the scheduler agent translating instructions from the instructions to a format suitable for use by the operating system.

* * * * *